United States Patent Office 3,364,742
Patented Jan. 23, 1968

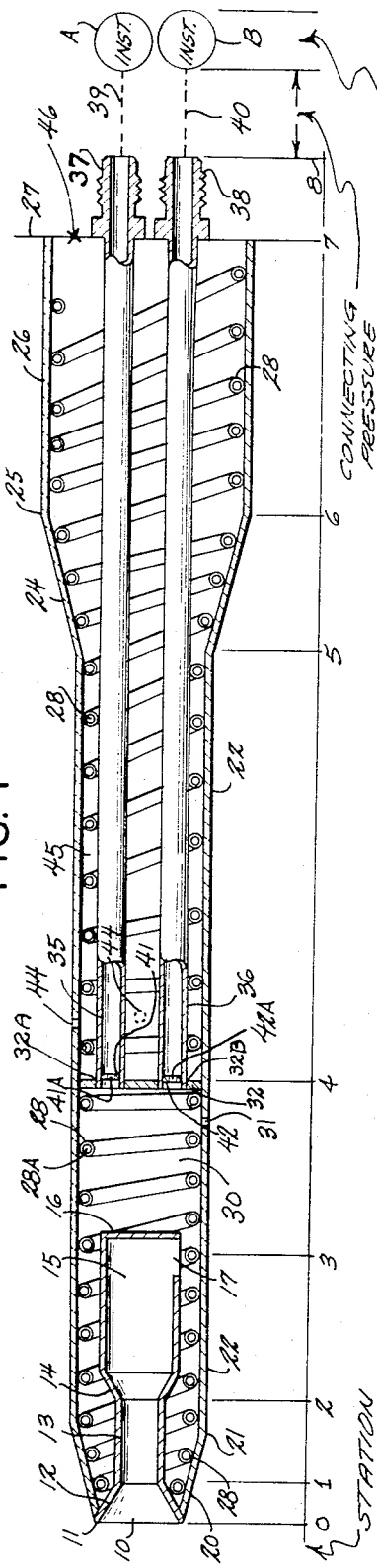
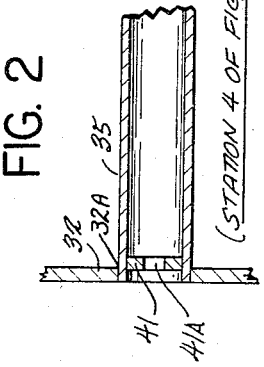
FIG. 1
FIG. 2
FIG. 3
INVENTOR.
RICHARD V. DELEO
BY
Dugger, Braddock, Johnson & Westman
ATTORNEYS

3,364,742
DUAL PITOT AND/OR STATIC SYSTEM
Richard V. De Leo, Hopkins, Minn., assignor to Rosemount Engineering Company, Minneapolis, Minn., a corporation of Minnesota
Filed June 26, 1964, Ser. No. 378,368
12 Claims. (Cl. 73—212)

This invention relates to a dual pitot and/or static system for aircraft or missiles. The invention may also be used for other vehicles, either ground or airborne, for measurement of pitot, static, or other pressures.

It is well known in the missile and aircraft art that the use of dual pitot pressure and dual static pressure systems will significantly increase reliability. Most commonly, there has been provided complete duplicate systems for measurement of the desired pressure on the aircraft or missile. For example, on supersonic aircraft, a pitot static tube may be used on the nose of the aircraft, and a second pitot tube may be located on the fuselage. Static ports may be incorporated in the nose-mounted pitot tube which, therefore, makes such device a pitot-static measuring device. Additional static ports may be located on the fuselage. The pressure measured by a pitot tube mounted from the fuselage will agree reasonably well with the pressure measured by the pitot tube on the nose when the aircraft is used for sub-sonic flight but generally there will be a marked disagreement in the pitot pressures measured at the two locations when the aircraft moves at supersonic speeds. Similarly, static pressure measurements taken on a nose boom, and static pressure measurements taken at some other point on the aircraft, as on the side of the fuselage, will agree reasonably well at sub-sonic speeds but there will be marked disagreement between static pressures measured at such locations when the aircraft moves at supersonic speeds. The use of dual nose booms has been considered but is regarded as impractical from the standpoint of cost, weight and complexity of mounting, and in addition, there is some interference between dual nose booms in respect to the measurements produced thereby, particularly at supersonic speeds.

It is a primary object of the invention to obtain substantially dual pitot tube and pitot-static tube reliability without the use of two pitot tubes on an aircraft or missile. It is another object of the invention to provide an improved pitot and/or pitot-static tube structure and system for aircraft and missiles. It is a further object of the invention to provide at substantially lower cost, an improved pitot and/or pitot-static tube and system providing substantially the reliability of independent and completely separate pitot and/or pitot-static tubes and systems.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURE 1 is a longitudinal sectional view of the improved pitot and/or pitot-static tube of the present invention;

FIGURE 2 is an enlarged fragmentary longitudinal sectional view of the portion of the apparatus shown in FIGURE 1; and, FIGURE 3 is a diagrammatical view illustrating the functioning of the invention.

Throughout the drawings, corresponding numerals refer to the same parts.

Referring to the drawings, for the purposes of illustration, there is shown a pitot tube structure suitable for mounting on the forward surface of an aircraft or missile. This is, however, to be considered as merely exemplary. The forward surface may be the nose of the aircraft or missile, or some forward facing surface. In the event the pitot tube is mounted from the side of the fuselage or from some other portion of the aircraft or missile structure a suitable bracketing will be understood to be provided.

The pitot tube illustrated in FIGURE 1 has, beginning at the left (i.e. Station 0), an entrance mouth 10, defined by a sharp edge 11, usually circular in design. This entrance mouth leads into a conical forward portion 12 (Station 0 to Station 1) which in turn, leads into a cylindrical bore 13 (Station 1 to Station 2), that continues to a conical enlargement portion 14 extending into a moisture trap 15 having the end wall 16 and downwardly facing opening 17 (Station 3). The outer portion of the pitot tube includes the conical nose section 20, which extends from the forward sharp edge 11 to a certain outer diameter 21 after which the outer structure continues at uniform diameter at 22, until reaching Station 5, where it extends through the integrally formed conical enlargement section 24 to the diameter at 25 (Station 6) and thence continues at the same diameter through section 26 to the mounting surface here illustrated at 27. Any suitable mounting may be provided for tube 26 at Station 7.

Within all or any portion of the interior surface of the outer pitot tube structure 20–26, there is provided a heating coil 28 which can be a metallic or plastic sheathed heating structure containing an electrically insulated heating wire 28A. The electrical connections for this heating structure are not illustrated. The heating structure is bonded by cement (if the sheath is non-metallic) or by brazing (if the sheath is metallic) to the interior surface of the entire or any portion of the outer pitot tube structure 20–22–24–26 and therefore provides sufficient heat to maintain such structure at a temperature sufficiently high so that ice formed on the exterior will be shed off the exterior surface and not permitted to accumulate, and in addition, any precipitation which enters the mouth 10 and flows through the tube into the moisture trap 15 will not be permitted to accumulate as ice, but will melt and flow through the downwardly facing aperture 17 into the space 30 from which moisture may discharge via aperture 31 to the exterior. If desired, the moisture drain can be as shown in copending application, Ser. No. 192,830, filed May 7, 1962.

Along the length of portion 22 of the pitot tube structure at Station 4, there is provided a barrier wall 32. This wall is integrally attached to the interior surface of the pitot tube structure and divides the interior into a forward chamber 30 and a rearward chamber 45. Pressure building up in the chamber 15 and delivered via the opening 17 will be transmitted to the chamber 30 and against wall 32. This is the pitot tube pressure of the instrument.

Through the wall 32 there are two apertures 32A and 32B through each of which there projects the forward end of a pressure tube, as tubes 35 and 36, said tubes being attached to the wall in pressure tight relation. These pitot tubes 35 and 36 carry the "pitot pressure" back to instruments at remote locations in the aircraft or missile. In the illustrated embodiment, tubes 35 and 36 extend rearwardly (to the right as shown in FIGURE 1) from the wall, Station 4, to Station 7, where, for convenience, they are terminated at couplings 37 and 38 respectively. Coupling 37 and hence tube 35 also, is attached to the pressure line 39 leading to Instrument A at a remote location, and coupling 38 and hence tube 36 is attached to line 40 leading to Instrument B. At the forward end of the tubes 35 and 36, which is to the left as shown in FIGURE 1, where they protrude through the wall 32 at Station 4, each tube is provided with a small restricting orifice as at 41 and 42 respectively. The orifice for tube 35 is shown in greater detail in FIGURE 2; that for tube 36 is similar. The orifice plate (or bead) 41 has a central aperture 41A, which is considerably smaller in area than the cross-sectional area of the interior of the tube 35. The orifice plates (or beads) 41 and 42 are sweated into place in their respective tubes and therefore, pressure is delivered from the space 30, thence through the aperture 41A of the orifice plate 41 to the interior of the tube 35, and pressure is delivered from the space 30 through the aperture 42A of the orifice 42 and into the interior of the tube 36.

Where the structure shown in FIGURE 1 is also to measure static pressure, one or more orifices as at 44—44, may be provided to the right of the wall 32, and the static pressure from the exterior and communicated via holes 44—44 into the interior space 45, (within that portion of the tube 22 which is to the right of the wall 32, as shown in FIGURE 1) will then be delivered via tube 22–24–26 to the mounting 27, and consequently may be conveyed by a pressure connection made through plate 27 at 46, and such pressure will then be the "static pressure" of the instrument. Where the static pressure is not desired to be measured, the apertures 44—44 and the connection 46 are omitted.

The size of the orifices 41A and 42A may be varied. In a practical case, the tubes 35 and 36 were of 0.25 inch diameter I.D., and the orifices 41A and 42A were made 0.10 inch diameter and of an axial length 0.10 inch. It is important that the forward diameter of section 13, i.e. Station 2, have a diameter such that it will have a much lesser resistance to flow than the resistance of flow imposed by the orifices 41A and 42A. In a practical application, the pitot system consists of a large pitot opening of say ⅓ inch diameter at Station 0, decreasing to ¼ inch diameter for section 13, i.e. Station 1–2, leading into the moisture trap 15. It may be noted parenthetically, that the use of a moisture trap 14–15–16–17 and drain 31 is not essential to the invention and may be eliminated if not needed. In such a practical system, the orifices 41A and 42A may have a diameter of 1/10 inch and an axial length of 1/10 inch.

Under normal operation, there will be little or no flow through lines 35 and 36, as where the Instruments A and B are pressure measuring devices. However, lines 35–37–39 or line 36–38–40 may break or leak or where (as is usually the case) the pressure Instruments A and B may have glass fronts and if a glass becomes broken, then unwanted, erroneous flow will be permitted from the lines or instruments. Assuming that leakage is present at some point along lines 35–39 or Instrument A, or assuming that leakage is present at some point along line 36–40 or at Instrument B, a flow will occur from the space 30 through the orifice 41A or 42A, into the leaky line or instrument. If this leakage is large as compared to the size of the pitot opening 13, the pneumatic system would be essentially short circuited (i.e. vented to a lower pressure) and the system would read erroneously. In the case of the dual pitot system of the present invention flow is restricted by the orifices 41A and 42A. According to the invention, the dimensions of the tubing and system from Station 1 to Station 4 (i.e. to orifices 41A and 42A) are considerably larger in size than the orifices, and therefore, pressures will be essentially unaffected by leakage flow caused by a failure in the lines 35–39 or Instrument A, or a failure in the lines 36–40, or Instrument B.

FIGURE 3 is a diagrammatic view showing the electrically equivalent of the pneumatic system of FIGURE 1. In FIGURE 3, the potential source is shown by battery B, which connects via line 50 to the beginning point at P11, which corresponds to the pitot aperture at the forward sharp edge 11 in FIGURE 1. The potential or pressure at this point is delivered through the converging neck 12 and entrance tube 13, and (where used) through the moisture trap 14, 15, 16, to the opening 17, and into the interior space 30. The resistance to flow afforded between Station 0 and Station 4 is illustrated at RO–4 in FIGURE 3, and after having passed through this resistance the pressure or potential is the pressure existing at junction P30, and this pressure corresponds to the pneumatic pressure in the space 30 of the structure shown in FIGURE 1. From space 30 the pressure or potential is delivered via two circuits. One of these circuits is through the orifice 41A and lines 35–39 and thence through Instrument A. In FIGURE 3, the resistance at the restrictor or orifice 41A is designated R41A, and after having passed through this restrictor the flow then continues via the line 35 and 39 in series, in FIGURE 1, this being designated as L35–39 in FIGURE 3. The circuit then continues through the Instrument A which in FIGURE 3 is designated as RA. For all practical purposes, in a pressure measuring instrument, this resistance will be an infinite resistance and hence resistance RA of FIGURE 3 is illustrated as being very large, i.e., an infinite resistance. The circuit then extends via line 51, to ground G, which is also connected back via line 52 to the battery B which is the source of potential. Similarly, a circuit extends in FIGURE 1 through the restrictor of orifice 42A, which in FIGURE 3 is the resistance R42A, and thence via the line 36–40, which in FIGURE 3 is designated L36–40 to the Instrument B, which similar to Instrument A has a very large, i.e. an infinite resistance. In FIGURE 3 this is designated RB.

Under conditions of satisfactory operation, the "flow" through resistance RO–4 to junction P30 and thence according to the upper branch of FIGURE 3, through resistance R41A, lines L35–39 and resistance RA, will be a substantially negligible "flow," due to the infinitely high resistance at RA. The same condition is true for the flow through resistance RO–4 and thence via the branch R42A, line L36–40 and resistance RB. However, if a leak should, for example, occur in line 39 or if the face of Instrument A should become broken and permit a large outflow of air therethrough, this would in effect be the same as introducing a fairly low resistance "short circuiting" connection from the Instrument RA through the leakage path RLA from the Instrument RA down to the line 52 or if the leakage occurred in the line L35–39, then this would be equivalent to introducing a fairly low resistance leakage path RL1 leading from the line L35–39 down to the line 52. Similarly, if for example, a broken face or other leaks occurred in the Instrument B, then this would be equivalent to introducing a fairly low resistance leakage path RLB from the Instrument RB down to the line 52, or if a leak occurred in the line L36–40 the leakage path would be from that line down through the fairly low resistance leakage path RL2 to the line 52.

By making the resistance of flow at the restrictor orifices 41A and 42A quite high, such as ten to one hundred times the resistance to flow of from Station 0 to Station 3 (that is to say from the inlet 11 into the space 30) then if a large leak should occur in lines 35–39 or Instrument A, or in lines 36–40 or Instrument B, the leakage flow will not be sufficiently high to disturb the measurement provided by the non-leaking line and instrument by an amount which is more than acceptable. For example, if a restriction to flow imposed by the restrictor orifices 41A and 42A is made ten times as great (preferably on hundred times as great) as the restriction to flow from the entrance 11 to the space 30 (i.e. from Station 1 to Station 3 in FIGURE 1) then if a short circuit leakage flow occurs from say line 35–39 to the exterior of the instrument, or a full short circuit leakage occurs through the instrument A, under such conditions, the reading of Instrument B will not be erroneous by more than 10%. A similar condition of reading occurs for Instrument A in the event there is a full short circuit leakage in the lines 36–40 or through Instrument B, the line 35–39, Instrument A, meanwhile being in good condition.

Therefore, according to the present invention, by interposing the restrictor orifices in the lines, if a leakage of substantial proportions occurs in one line, this will not disturb the reading of the other instruments, lines and systems by more than an acceptable amount.

It will be obvious that the same dual instrument circuit as typified in FIGURE 1 and illustrated and further explained in FIGURE 3 may be applied to dual static lines as well as to the dual pitot lines. The only difference is that the point of pick up of pressure will be different for static lines then for pitot lines.

As many widely apparently different embodiments of this invention may be made without departing from the spirit and scope thereof, it is to be understood that I do not limit myself to the specific embodiments disclosed herein.

What is claimed is:

1. A pressure sensor for measuring air pressure on an aircraft, missile or the like, comprising a pressure chamber having an entrance thereinto, said entrance forming an air flow path into said pressure chamber, and a plurality of pressure lines connected to and for sensing pressure in said chamber, each of said lines being separately connected to a remotely located instrument, and restrictor means in each of said pressure lines proximate its connection to the pressure chamber, each said restrictor means being of a size such that it imposes a substantially larger resistance to air flow than is imposed by said air flow path.

2. The apparatus of claim 1 further characterized in that the pressure chamber is in the form of an elongated tube and said entrance is in the form of a mouth facing in the direction of motion of the vehicle on which the device is mounted.

3. The apparatus of claim 1 further characterized in that said restrictor means impose several times as much restriction to air flow as does said air flow path.

4. The apparatus of claim 1 further characterized in that said restrictor means impose from about ten to about one hundred times as much restriction to air flow as does said air flow path.

5. The apparatus of claim 1 further characterized in that said air flow path includes a moisture separator and said pressure chamber has a moisture drain.

6. The apparatus of claim 1 further characterized in that the wall of said pressure chamber is provided with electrical heating means.

7. The apparatus of claim 1 further characterized in that two pressure lines, each having restrictor means, are provided.

8. A pressure sensor for a vehicle movable through the atmosphere comprising an elongated cylindrical tube having a forward end adapted to project in the direction of motion of the vehicle and a rearward end adapted to be connected to the vehicle, said forward end being tapered to a reduced diameter terminating in a forwardly directed pitot opening into which the atmosphere is adapted to enter, a pressure tight wall intermediate the ends of said tube, said wall separating the tube into a forward space into which the pitot opening opens and a rearward space extending to the rear end of the tube, small relief channels extending from adjacent the bottom of the forward space and through the tube wall for delivering moisture therefrom, a pair of pressure tubes of a sufficiently small size so as to be easily contained in the elongated cylindrical tube, means to connect said pressure tubes to pressure indicating instruments said pressure tubes extending from the rearward end of the cylindrical tube and thence forwardly through the rearward space to and through the wall and into the forward space, and a small restrictor plug having a restrictive orifice therethrough mounted in the forward end of each of said pressure tubes adjacent their forward ends where they terminate in the forward space.

9. The apparatus of claim 8 further characterized in that the restrictor plugs have a resistance to air flow in the range of about ten to about one hundred times the restriction to air flow imposed by the pitot opening and flow path into said forward space.

10. The apparatus of claim 8 further characterized in that a channel connected to the pitot opening is fitted into the forward space, said channel being shaped and terminated so as to deliver air flow into said forward space but separate discrete particles of moisture and deposit them at the bottom of said forward space.

11. The apparatus of claim 8 further characterized in that a wall heater is mounted in thermal communicating relationship on the inside of the cylindrical tube.

12. The apparatus of claim 8 further characterized in that at least one pressure opening is provided in the wall of the cylindrical tube at a position rearwardly of said wall for communicating static pressure thereinto.

References Cited

UNITED STATES PATENTS

| | | | |
|---|---|---|---|
| 2,510,986 | 6/1950 | Larkin | 73—212 |
| 2,645,123 | 7/1953 | Hundstad | 73—212 X |
| 3,050,996 | 8/1962 | Henderson | 73—182 |

FOREIGN PATENTS

| | | |
|---|---|---|
| 521,294 | 5/1940 | Great Britain. |
| 750,417 | 6/1956 | Great Britain. |

RICHARD C. QUEISSER, *Primary Examiner.*

E. D. GILHOOLY, *Assistant Examiner.*